(No Model.)
J. JAEGER.
REIN SUPPORTER FOR HARNESS.
No. 249,631. Patented Nov. 15, 1881.
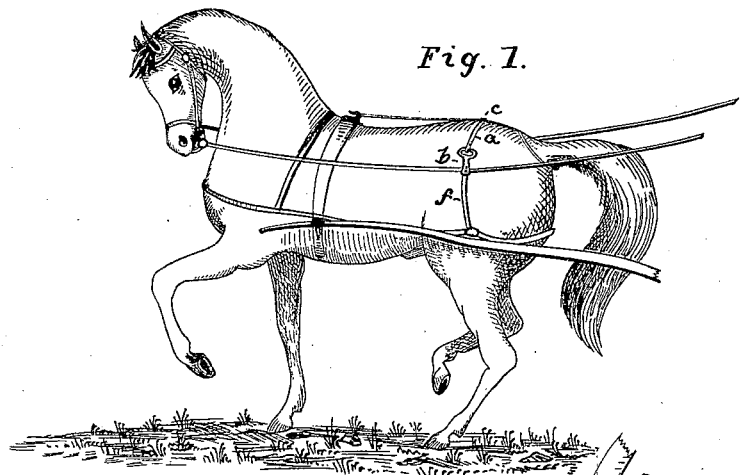
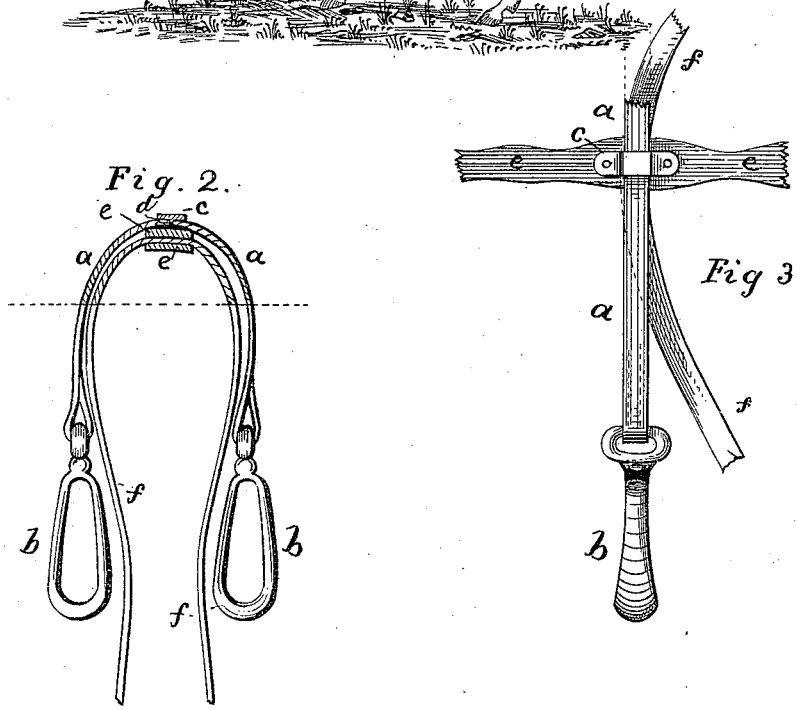
WITNESSES:
Thos. Houghton.
A. G. Lyne.
INVENTOR:
Julius Jaeger
BY
ATTORNEYS.

UNITED STATES PATENT OFFICE.

JULIUS JAEGER, OF MAYBEE, MICHIGAN.

REIN-SUPPORTER FOR HARNESS.

SPECIFICATION forming part of Letters Patent No. 249,631, dated November 15, 1881.

Application filed June 28, 1881. (No model.)

*To all whom it may concern:*

Be it known that I, JULIUS JAEGER, of Maybee, in the county of Monroe and State of Michigan, have invented a new and useful Improvement in Rein-Supporters for a Harness, of which the following is a full, clear, and exact description, reference being had to the annexed drawings, forming part of this specification.

The object of my invention is to provide a device for supporting the reins by which a horse in harness is driven in such manner that they cannot be caught under the horse's tail or ends or buckles of the hip-straps.

The invention consists in a supporting device which is adapted for being attached to any harness, as hereinafter described.

In the accompanying drawings, Figure 1 is a view showing the application of my invention to use; Fig. 2, a partly sectional view of the rein-supporter, showing the manner of attaching the same to a harness; and Fig. 3, a top view of the same, partly broken away.

The rein-supporter consists in a strip of leather, $a$, six or eight inches in length, which is provided with a suitable metal loop, $b$, at each end. The loops are so constructed that when secured to the leather strip $a$, and the strip is secured to the harness so that the loops will hang down the animal's hips, respectively, the reins attached to the bridle-bit may be passed along the back of the animal, through the loops, and thus to the driver's hands. By constructing the loops in the form of elliptical rings, as shown, the reins cannot become accidentally displaced therefrom.

For securing the supporter in position I provide a metal plate, $c$, having a suitable rectangular depression on the under side for receiving the strip $a$, and provided with perforations near the ends for receiving rivets, by which the plate is to be secured to the back-strap. A projection, $d$, is formed in the central portion, which shall project into the rectangular space sufficiently to engage with a perforation in the center of the strip $a$. The strip is then secured in place, as indicated, and the plate $c$ is riveted to the back-strap $e$ of the harness just above the animal's hips. By securing the plate and supporter in this manner the cross-strap $f$, by which the breeching is to be sustained, is allowed free endwise movement through the slit in the back-strap just beneath the plate $c$.

With this construction the reins will be held sufficiently apart to prevent being caught under the animal's tail or engaging with the ends or buckles of the hip-straps.

Having thus described my invention, what I claim as new, and desire to secure by Letters Patent, is—

A rein-supporter for a harness, consisting in the strip $a$, having two elliptical rings, $b$, and combined with the back-strap $e$, and the rectangular plate $c$, having projection $d$, substantially as shown and described, whereby free endwise movement is allowed the cross-strap which supports the breeching.

JULIUS JAEGER.

Witnesses:
MARTIN F. VAN BUREN,
J. H. MANN.